United States Patent
Burns

(10) Patent No.: US 8,020,914 B2
(45) Date of Patent: Sep. 20, 2011

(54) VISOR SUPPORT AND METHOD

(75) Inventor: Stephen F. Burns, Huntertown, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 53 days.

(21) Appl. No.: 12/508,034

(22) Filed: Jul. 23, 2009

(65) Prior Publication Data

US 2011/0018305 A1 Jan. 27, 2011

(51) Int. Cl.
*B60J 3/02* (2006.01)
(52) U.S. Cl. ........................... 296/97.9; 296/97.13
(58) Field of Classification Search ............... 296/97.5, 296/97.6, 97.7, 97.8, 97.11, 97.12, 97.13, 296/97.9, 97.4; 248/278.1
See application file for complete search history.

(56) References Cited

U.S. PATENT DOCUMENTS

| | | | |
|---|---|---|---|
| 2,084,584 A | 6/1937 | Jacobs | |
| 2,110,120 A | 3/1938 | Ball | |
| 2,357,974 A | 9/1944 | Roberts | |
| 2,939,741 A | 6/1960 | Keating et al. | |
| 3,017,217 A | 1/1962 | Keating | |
| 3,150,896 A | 9/1964 | Plattner | |
| 3,399,923 A | 9/1968 | Bornefeld et al. | |
| 3,409,317 A * | 11/1968 | Richards | 403/138 |
| 3,477,678 A | 11/1969 | Icke et al. | |
| 3,767,256 A | 10/1973 | Sarkees | |
| 4,023,856 A | 5/1977 | DeRees | |
| 4,148,519 A | 4/1979 | Hollar, Jr. | |
| 4,178,035 A | 12/1979 | Cziptschirsch | |
| 4,352,518 A | 10/1982 | Prince et al. | |
| 4,377,020 A | 3/1983 | Vigo | |
| 4,525,008 A | 6/1985 | Foggini | |
| 4,529,157 A | 7/1985 | Suman et al. | |
| 4,553,797 A | 11/1985 | Marcus | |
| 4,569,552 A | 2/1986 | Marks | |
| 4,634,196 A | 1/1987 | Nestell | |
| 4,653,708 A | 3/1987 | Rich | |
| 4,729,590 A | 3/1988 | Adams | |
| 4,989,911 A | 2/1991 | Van Order | |
| 5,031,953 A * | 7/1991 | Miller | 296/97.9 |
| 5,031,954 A | 7/1991 | Peterson et al. | |
| 5,056,853 A | 10/1991 | Van Order | |
| 5,082,322 A | 1/1992 | Cekander et al. | |
| 5,098,151 A * | 3/1992 | Peterson | 296/97.9 |
| 5,236,240 A | 8/1993 | Burns et al. | |
| 5,242,204 A | 9/1993 | Kitterman et al. | |
| 5,314,227 A * | 5/1994 | Weiland et al. | 296/97.9 |
| 5,451,022 A | 9/1995 | Peterson | |
| 5,544,927 A | 8/1996 | Snyder et al. | |
| 5,697,140 A | 12/1997 | Crotty, III et al. | |

(Continued)

*Primary Examiner* — Glenn Dayoan
*Assistant Examiner* — Sunsurraye Westbrook
(74) *Attorney, Agent, or Firm* — Jeffrey P. Calfa; Mark C. Bach; Gerald W. Askew

(57) ABSTRACT

Embodiments disclosed herein relate to a visor support and a method of supporting a visor. In one embodiment, the support comprises a body and a flange with the visor is attached to the body such that the visor moves with respect to the body. A fastener attaches the body to the flange such that the body moves with respect to the flange. A first detent is disposed on the flange. A first ball is disposed on the body. The first ball is engageable with the first detent to control vertical movement of the visor. A second detent is disposed on the visor. A second ball is disposed on the body. The second ball is engageable with the second detent to control horizontal movement of the visor.

4 Claims, 1 Drawing Sheet

U.S. PATENT DOCUMENTS

| | | | |
|---|---|---|---|
| 5,752,853 A | 5/1998 | Curtindale | |
| 5,765,897 A | 6/1998 | Snyder et al. | |
| 5,765,898 A | 6/1998 | Crotty, III | |
| 5,829,817 A * | 11/1998 | Ge | 296/97.9 |
| 6,003,928 A | 12/1999 | Curtindale | |
| 6,021,986 A | 2/2000 | Murdock | |
| 6,079,685 A | 6/2000 | Jacquemin | |
| 6,454,503 B1 | 9/2002 | Polic et al. | |
| 6,517,039 B1 | 2/2003 | Arisaka | |
| 6,547,308 B2 | 4/2003 | Hamelink et al. | |
| 6,719,352 B2 | 4/2004 | Arendsen et al. | |
| 6,796,593 B2 | 9/2004 | Hennessey | |
| 6,817,583 B2 | 11/2004 | Wilson | |
| 7,325,854 B2 | 2/2008 | Lanser et al. | |
| 2008/0030042 A1 * | 2/2008 | Slobodecki et al. | 296/97.9 |

* cited by examiner

VISOR SUPPORT AND METHOD

BACKGROUND

Embodiments described herein generally relate to a support for a visor and a method of supporting a visor.

A visor may be used to limit an operator, such as a driver of a vehicle, from exposure to sunlight. It may be advantageous for the operator to move periodically the visor to provide desired sunlight protection. Often, the operator manipulates the visor using a support associated with the visor. The support may include a number of parts, such as a clip, a spring and the like. The parts may wear or fail from time to time, thereby complicating movement of the visor and requiring repair or replacement. It is desirable to improve the support.

SUMMARY

Embodiments disclosed herein relate to a visor support and a method of supporting a visor. In one embodiment, the support comprises a body and a flange with the visor is attached to the body such that the visor moves with respect to the body. A fastener attaches the body to the flange such that the body moves with respect to the flange. A first detent is disposed on the flange. A first ball is disposed on the body. The first ball is engageable with the first detent to control vertical movement of the visor. A second detent is disposed on the visor. A second ball is disposed on the body. The second ball is engageable with the second detent to control horizontal movement of the visor.

DETAILED DESCRIPTION

As shown in the Figures, embodiments disclosed herein relate to a support 10 associated with a visor 12 and methods for supporting a visor. The visor 12 may be of any suitable construction and configuration, such as those inherent with a visor commonly used with a truck. The support 10 and the visor 12 may be used in any appropriate environment, such as a vehicle window and the like. The support 10 enables movement of the visor 12 to provide desired screening to an operator. The support 10 is generally cylindrical in external shape. The support 10 may be made in any suitable manner, such as cast from any suitable material, such as a polymer like EPP. Other materials and manufacturing methods are possible.

Figure 1:
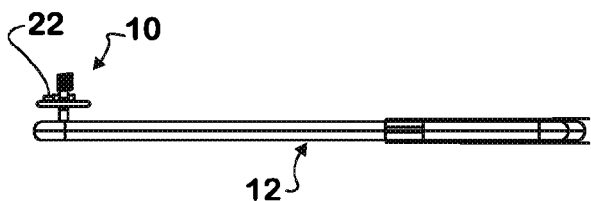
FIG. 1 is an elevational view of an embodiment of a visor support described herein.
Figure 2:
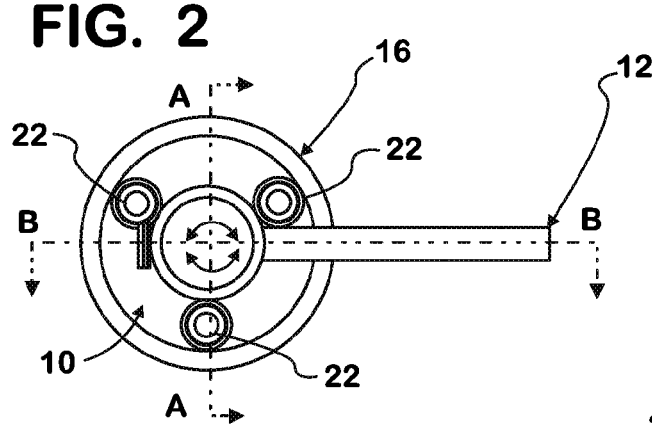
FIG. 2 is an enlarged view of a portion of the visor support of FIG. 1.
Figure 4:
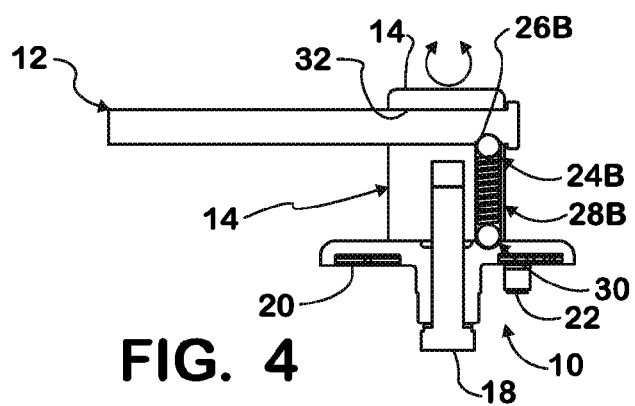
FIG. 4 is a sectional view, taken along line B-B of FIG. 2.

The support 10 comprises a body 14 and a flange 16. The body 14 is coupled to the flange 16 by a fastener 18, such as a bolt and the like. As shown in FIGS. 2 and 4, an end of the body 14 opposite to an end thereof adjacent the flange 16 is connected with the visor 12. In one embodiment, the end of the body 14 opposite to the flange 16 includes a bore 32 that accepts a portion of the visor 12. There is sufficient clearance between the bore 32 and the portion of the visor 12 to permit movement of the visor 12 with respect to the body 14.

In the illustrated embodiment, the flange 16 includes a bore 20 accepting a fastener 22 that attaches the flange 16 to a support surface, such as a window frame. In this manner, the flange 16 can be fixed with respect to the support surface. As the body 14 is movable with respect to the flange 16, the visor 12 is moveable with respect to the flange 16 and the support surface.

Figure 5:
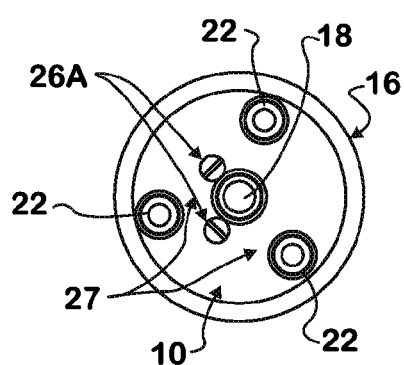
FIG. 5 is an end view of a portion of the visor support of FIG. 1.

The support 10 includes at least one feature that positively limits or controls movement of the visor 12. As shown in FIGS. 2 through 5, the feature includes a ball and a detent for each dimension of movement of the visor 12. As the illustrated embodiment allows movement of the visor 12 in two dimensions, the illustrated embodiment includes a pair of balls 24A and 24B and a corresponding pair of detents 26A and 26B. The ball 24A and detent 26A relate to vertical movement of the visor 12 as the detent 26A is located on the flange 16. The ball 24B and detent 26B relate to horizontal movement of the visor 12 as the detent 26B is located on a portion of the visor 12. The balls 24A and 24B are biased towards their respective detents 26A and 26B by resilient members, such as springs, 28A and 28B. Each detent corresponds to a desired location for the visor 12 as the position of the visor 12 is maintained by disposition of a ball in its associated detent. Accordingly, there may be a plurality of detents for each ball with each detent corresponding to a specific position of the visor 12. For example, FIG. 5 shows two detents 26A for the ball 24B.

It is to be noted that the visor 12 can be located in positions other than the positions associated with a detent. For example, FIG. 5 shows two detents 26A that accept ball 24A. Each detent 26A corresponds to a position of the visor 12. The ball 24A may ride upon a surface 27 of the flange 16 so that the visor 12 can assume an intermediate position other than the positions associated with the detents 26A. Sufficient friction exists in the support 10 to maintain the visor 12 in the intermediate position.

Figure 3:
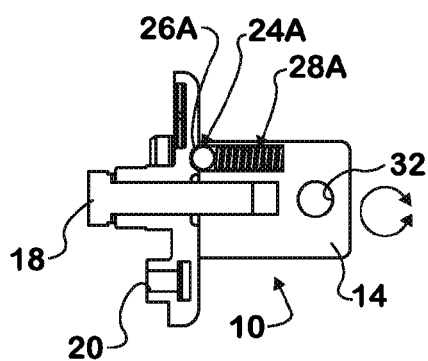
FIG. 3 is a sectional view, taken along line A-A of FIG. 2.

The balls and associated springs may be retained with respect to the support 10 in any appropriate manner. For example, as shown in FIG. 3, the ball 24A and the spring 28A are contained in a bore in the body 14 by an interference fit between the ball 24A and a portion of the bore. Alternatively, as shown in FIG. 4, the spring 28B is trapped in a bore in the body 14 between the ball 24B and a set screw 30. The bore includes threads for the set screw 30 that permit relative movement of the body 14 and the flange 16 upon appropriate torquing of the set screw 30. In some embodiments, the ball and spring construction may be replaced with a threaded spring plunger or similar item.

The embodiments described herein allow for movement of the visor 12 in any position commonly desired. Once the visor 12 is moved such that a ball is disposed in a detent, engagement of the ball and the detent retains position of the visor 12. When the operator wishes to change position of the visor 12, the operator applies suitable force to the visor 12 such that a force retaining a ball in a detent is overcome. The ball is freed from the detent and the visor 12 can be moved while the ball rides along a surface. The operator moves the visor 12 to another position, viz. either the intermediate position or a position corresponding to a detent.

What is claimed is:

1. A support for a visor, the support comprising:
a body, the visor being attached to the body such that the visor moves with respect to the body;
a flange;
a fastener attaching the body to the flange such that the body moves with respect to the flange;
a first detent disposed on the flange;

a first ball disposed on the body, the first ball being engageable with the first detent to control vertical movement of the visor;

a second detent disposed on the visor; and a second ball disposed on the body, the second ball being engageable with the second detent to control horizontal movement of the visor.

2. The support as defined in claim 1 further comprising:

a bore disposed on the flange; and a fastener disposed in the bore for attaching the flange to a support surface.

3. The support as defined in claim 1 further comprising:

a first resilient element associated with the first ball for biasing the first ball into engagement with the first detent.

4. The support as defined in claim 1 further comprising:

a second resilient element associated with the second ball for biasing the second ball into engagement with the second detent.

* * * * *